3,523,114
POLYMERIZATION OF ISOPRENE
Morris Gippin, Fairlawn Village, Ohio, assignor to The Firestone Tire & Rubber Company, Akron, Ohio, a corporation of Ohio
Filed June 7, 1968, Ser. No. 735,403
Int. Cl. C08d 3/10
U.S. Cl. 260—94.3     5 Claims

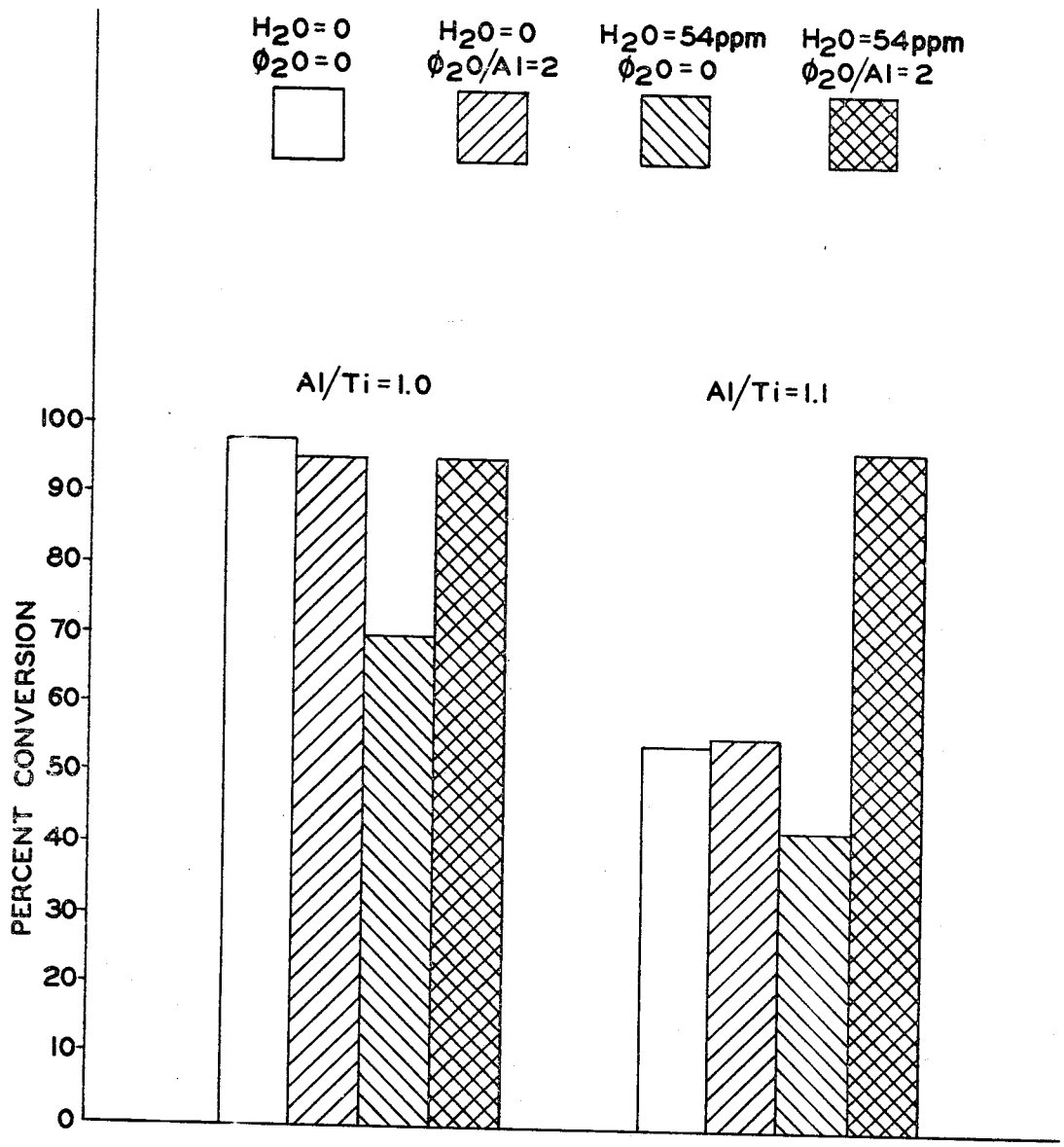

ABSTRACT OF THE DISCLOSURE

In the polymerization of isoprene with trialkylaluminum-titanium chloride catalyst at the mole ratio of 1.0, the ether adduct of the trialkylaluminum compensates for the deleterious effect upon the catalyst of water present in the isoprene solution in hydrocarbon. At the trialkylaluminum-titanium chloride ratio in excess of 1 up to 1.5, both ether and water act synergistically to give a catalyst capable of high conversion power.

---

It is known that the efficiency of the Ziegler catalyst in polymerizing isoprene to a high cis-1,4 polymer is critically dependent upon the mole ratio of the $R_3Al$ (where R is an alkyl group of 1 to about 12 carbon atoms) and $TiCl_4$. The term "catalyst efficiency" as used in this specification denotes the conversion of isoprene to polymer recoverable by the alcohol coagulation of the polymerizate. For maximum conversion power the mole ratio of these components (Al/Ti) is optimally close to 1.0. At this ratio the reaction between $R_3Al$ and $TiCl_4$ at room temperature, and with some minimum period of aging, leads to $R_2AlCl$ and $\beta$-$TiCl_3$. These products then function by a mechanism, as yet not fully understood, in the polymerization of isoprene.

Because of the high degree of specificity of the $R_2AlCl$ and $\beta$-$TiCl_3$ so produced toward the efficient polymerization of isoprene, it follows that the presence of altered forms of these specific components will result in a departure from the maximum catalyst efficiency and also the characteristic properties of the polymer product. The catalyst so altered would depend upon the extent to which reactions can take place between the catalyst and extraneous substances in the system, particularly water, and also on the initial mole ratio of the reacting catalyst components.

Early reports on the polymerizations of isoprene with the Ziegler-Natta catalyst indicated a polymer product of moderate conversion and considerable gel. The addition of additives including diphenyl ether was proposed to give increased rates and also improved properties of the compounded and cured polyisoprene rubber. Ether and amines were said to increase the polymerization rate and the molecular weight, and to suppress gel formation.

It has been found that there is an interrelationship between the critical Al/Ti mole ratio, the presence of low level of water in the isoprene-solvent solution, and the mole ratio of the diphenyl ether adduct of the trialkylaluminum component.

It is known that the 1.0 Al/Ti ratio must be maintained within very narrow limits in order to avoid uneconomically low polymer conversions. An advantage of this invention is the permissible broadening of the Al/Ti ratio in excess of 1, while obtaining high conversions, a fact which will be appreciated in scaled-up production.

From the accompanying drawing it is evident that if both a small amount of water and a small amount of diphenyl ether are present, high conversions are obtained without the necessity of carefully controlling the Al/Ti ratio; and especially with ratios above 1 to which the commercial prior art is limited, such as 1.025 or 1.05 up to 1.1 and higher, as for example 1.2 or 1.3 up to 1.5. Using ratios of, for example, 1.5 and higher, very low conversions of low-molecular-weight, undesirable products are obtained.

In carrying out the reaction of the invention with both a small amount of water and a small amount of ether, the catalyzing amount of the trialkylaluminum which may be employed is, for example, 1.0 to 10.0 or more millimoles per 100 grams of isoprene. Tributylaluminum, and preferably tri-isobutylaluminum, is presently preferred.

In the drawing, the effect of adding diphenyl ether to isoprene which contains water and catalyst in different ratios is illustrated. Using the conventional Al/Ti ratio of 1.0, the presence of water spoils a good catalyst, but the good catalyst is recovered by using ether. Using the Al/Ti ratio of 1.0, 1 mole of ether per mole of Al will compensate for the presence of up to and over 100 p.p.m. (parts per million) of water.

The situation is very different when the Al/Ti ratio of 1.1 is used. This is recognized as being a very poor catalyst. However, this becomes a very good catalyst when both water and ether are present. The drawing shows that they act synergistically. Using this catalyst ratio, one preferably uses either one or two moles of ether per mole of Al to give good synergistic action with up to and over 100 p.p.m. of water. Probably temperature, and perhaps other factors influence the amount of ether to be used with given amounts of water.

Between these Al/Ti ratios of 1.0 and 1.1, in ratios near 1.0, ether will counter the poor effect of water, and as a ratio of 1.1 is approached and passed, the synergistic effect of the water and ether will give a good catalyst.

In the experimental work, tri-isobutylaluminum was used as the trialkylaluminum, but other trialkylaluminums may be used including trimethyl, tri-n-propyl, tri-isopropyl, tri-n- hexyl, trioctyl aluminums.

Titanium tetrabromide might be used but does not give as high a cis-1,4-polyisoprene as titanium tetrachloride. Halides of other transition metals than titanium may be used but probably without as satisfactory results.

In the example, hexane was used as solvent, but other inert hydrocarbons (either aliphatic or aromatic) may be used but probably without as satisfactory results.

Runs were made with isoprene in hexane using tri-isobutyl aluminum, $(i-C_4H_9)_3Al$, titanium tetrachloride $(TiCl_4)$, diphenyl ether and water as catalyst. The ratio of the $(i-C_4H_9)_3Al$ to $TiCl_4$ was kept at 1.0 and 1.1 in different runs, and the results are separately recorded in Table I. The amounts of diphenyl ether and water were varied. The ether was reacted with the $(i-C_4H_9)_3Al$ before mixing with the $TiCl_4$, and the water was added as a benzene solution to the isoprene in hexane. The Al and Ti components were combined in the ratios shown, aged for one hour, then added to the isoprene-hexane. The runs were carried out at 5° C.

The first vertical column of the table gives the molar ratio of the diphenyl ether to the $(i-C_4H_9)_3Al$, $\phi_2O/Al$, the amount of $TiCl_4$ being constant at 3.0 millimoles per 100 grams of isoprene. By using more or less than this amount the molecular weight of the polymer and the rate of polymerization may be regulated. The top horizontal row indicates the parts of water added per million parts of a 20-percent solution of isoprene in hexane. The content of isoprene in solution may vary considerably but generally will be in the range of 10 to 40 percent. The mole ratios of (i-$C_4H_9$)$_3$Al to $TiCl_4$ illustrated in different parts of the table as Al/Ti are the optimum 1.0 and the now-made-useful 1.1 ratio.

TABLE I

| | P.p.m. H$_2$O | | | | |
|---|---|---|---|---|---|
| | 0 | 22 | 54 | 86 | 108 |
| | Al/Ti=1.1 | | | | |
| $\phi_2$O/Al=0 | 55.0 | 42.3 | 42.9 | 50.1 | 52.2 |
| $\phi_2$O/Al=1 | 54.9 | 64.5 | 78.6 | 76.8 | 80.6 |
| $\phi_2$O/Al=2 | 56.5 | 97.2 | 96.7 | 84.7 | 74.8 |
| $\phi_2$O/Al=4 | 55.4 | 98.8 | 98.0 | 79.2 | 29.3 |
| $\phi_2$O/Al=6 | 52.8 | 97.1 | 95.9 | 98.3 | 89.2 |
| | Al/Ti=1.0 | | | | |
| $\phi_2$O/Al=0 | 98.3 | 79.9 | 69.5 | 57.8 | 52.7 |
| $\phi_2$O/Al=1 | 89.5 | 97.3 | 97.8 | 89.5 | 88.8 |
| $\phi_2$O/Al=2 | 95.5 | 95.6 | 95.6 | 54.0 | 39.7 |
| $\phi_2$O/Al=4 | 98.2 | 92.7 | 97.9 | 44.5 | 37.5 |
| $\phi_2$O/Al=6 | 99.0 | 96.9 | 96.9 | 98.2 | 66.3 |

The results show that with no water present, the catalyst in which Al/Ti=1.1 gave low conversion. With no ether present the conversion was also low. However, when a small amount of ether was present with a trace of water, the yields increased. The maximum yield is found in the range from up to 22 to 86 parts (or more generally from up to about 20 to 100 parts) of water per 100 parts of the blend of 100 grams of isoprene and 400 grams of hexane, with 2 to 6 moles of ether per mole of (i-$C_4H_9$)$_3$Al.

In contrast with these effects at the Al/Ti=1.1 mole ratio is the run made using the mole ratio Al/Ti=1.0. The mole ratios of the diphenyl ether to the (i-$C_4H_9$)$_3$Al were varied from 0 to 6, as in the run with Al/Ti=1.1. The amounts of water contained in the isoprene-solvent blend were varied similarly to the previous run, and the $TiCl_4$ was kept constant at 3.0 millimoles per 100 grams of isoprene. It is known that as little as about 0.1 millimole of $TiCl_4$ per 100 grams of isoprene gives satisfactory results with Al/Ti=1.0, and 0.1 millimole of $TiCl_4$ may be used with Al/Ti=1.1, and as much as 20 millimoles of $TiCl_4$ may be used.

It will be seen that at the Al/Ti mole ratio of 1.0 in the absence of water and diphenyl ether the conversions are high. It is only when amounts of water varying from up to about 20 to 100 parts per million of the blend are present that the 1 to 6 moles of diphenyl ether per mole of (i-$C_4H_9$)$_3$Al are sufficient to restore the high-conversion power of the catalyst.

An important advantage in being able to use the Al/Ti=1.1 catalyst in preparing polyisoprene, is the relatively decreased amount of microgel present in the polymer when the Al/Ti mole ratio of 1.1 is used, compared to the 1.0 ratio. This is shown in the significantly reduced turbidity seen in a solution of about 4.0 grams of the polymer dissolved in 800 ml. of dry toluene. Up to a tolerance of about 50 parts per million of water or more in the isoprene-solvent blend, the amount of turbidity is seen to be less when the polymer is made with the Al/Ti=1.1 catalyst. This is shown in the tabulation given below wherein the degree of turbidity is expressed in pluses as follows:

3+: Cloudy
2+: Slightly cloudy
1+: Very slightly cloudy
0: Clear

TABLE II

| | P.p.m. H$_2$O | | | | |
|---|---|---|---|---|---|
| | 0 | 22 | 54 | 86 | 108 |
| | Al/Ti=1.1 | | | | |
| $\phi_2$O/Al=0 | + | +++ | +++ | +++ | +++ |
| $\phi_2$O/Al=1 | + | + | ++ | ++ | ++ |
| $\phi_2$O/Al=2 | + | ++ | +++ | +++ | +++ |
| $\phi_2$O/Al=4 | 0 | + | ++ | (¹) | (¹) |
| $\phi_2$O/Al=6 | 0 | + | ++ | ++ | ++ |
| | Al/Ti=1.0 | | | | |
| $\phi_2$O/Al=0 | + | ++ | +++ | +++ | +++ |
| $\phi_2$O/Al=1 | ++ | ++ | +++ | +++ | +++ |
| $\phi_2$O/Al=2 | ++ | +++ | +++ | +++ | +++ |
| $\phi_2$O/Al=4 | ++ | ++ | +++ | (¹) | (¹) |
| $\phi_2$O/Al=6 | ++ | ++ | +++ | +++ | ++ |

¹ Not measured.

Comparison of turbidity of dissolved polymers made with catalysts containing corresponding amounts of diphenyl ether and up to about 50 or more parts per million of water between the Al/Ti=1.1 and 1.0 catalysts indicates the reduced turbidity using Al/Ti=1.1 catalyst. Reduced mircogel means reduced aggregation of the very high molecular weight polymer, or reduced heterogeneity in the physical mixture of all molecular weight polymer molecules.

It is also shown that with up to about 50 to 80 parts per million of water, the introduction of diphenyl ether itself will reduce the solution turbidity, although blend wetness by itself will also cause turbidity.

The polyisoprene prepared by the process of this invention is to be used where polyisoprenes of the prior art have been used, as in the manufacture of tires, belts, etc.

I claim:

1. In polymerizing isoprene in an inert hydrocarbon solvent using as a catalyst (a) trialkylaluminum in which the alkyl groups contain 1 to 20 carbon atoms, and (b) titanium tetrachloride, with the molar ratio of the aluminum to the titanium in the aforesaid being 1 to 1.5, the improvement which comprises carrying out the polymerization in the presence of diphenyl ether and a trace of water not exceeding about 100 parts per million based on the amount of isoprene and solvent present, the molar ratio of the ether to the aluminum being substantially 1 to 6, and the total catalyst being sufficient to accomplish substantially complete conversion of the isoprene to polyisoprene.

2. The precess of claim 1 in which the ratio of aluminum to titanium is substantially greater than 1 and not over 1.1.

3. The process of claim 1 in which the alkylaluminum is tri-isobutylaluminum.

4. The process of claim 1 in which about 3 millimoles of titanium chloride is used per 100 grams of isoprene.

5. The process of claim 1 in which a 20-percent by weight solution of isoprene in hexane is used, 20 to 100 parts of water are used per million parts of the isoprene-hexane blend, 3 millimoles of titanium chloride are used per 100 grams of the isoprene, 1 to 6 moles of ether are used per mole of aluminum, and the ratio of the aluminum to titanium is substantially 1.1.

References Cited

FOREIGN PATENTS 1,486,486    5/1967    France.

JOSEPH L. SCHOFER, Primary Examiner

R. A. GAITHER, Assistant Examiner

UNITED STATES PATENT OFFICE
CERTIFICATE OF CORRECTION

Patent No. 3,523,114   Dated August 4, 1970

Inventor(s) Morris Gippin

It is certified that error appears in the above-identified patent and that said Letters Patent are hereby corrected as shown below:

Col. 2, line 46, cancel "but probably without as satisfactory results" (misprint)
and substitute:
--including heptane, benzene, toluene, etc.--

Col. 2, line 53, insert "(" before "i-$C_4H_9$)$_3$Al"

Col. 3, line 17 (Table I, last column under "108"), "52.1" should read --52.7--

Col. 4, line 4 (Table II, next to last column), "86" should read --56--

Col. 4, line 22, "mircogel" should read --microgel--

Col. 4, line 48, "precess" should reach --process--

Signed and sealed this 25th day of January 1972.

(SEAL)
Attest:

EDWARD M. FLETCHER, JR.
Attesting Officer

ROBERT GOTTSCHALK
Commissioner of Patents